United States Patent
Kim et al.

(10) Patent No.: US 10,091,527 B2
(45) Date of Patent: Oct. 2, 2018

(54) VIDEO FRAME ENCODING SYSTEM, ENCODING METHOD AND VIDEO DATA TRANSCEIVER INCLUDING THE SAME

(71) Applicant: Samsung Electronics Co., Ltd., Suwon-si, Gyeonggi-do (KR)

(72) Inventors: Taehwan Kim, Seoul (KR); Sungho Roh, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 260 days.

(21) Appl. No.: 14/938,248

(22) Filed: Nov. 11, 2015

(65) Prior Publication Data
US 2016/0156925 A1    Jun. 2, 2016

(30) Foreign Application Priority Data
Nov. 27, 2014    (KR) .................. 10-2014-0167307

(51) Int. Cl.
  *H04B 1/66*    (2006.01)
  *H04N 19/57*    (2014.01)
  *H04N 19/20*    (2014.01)

(52) U.S. Cl.
  CPC ............ *H04N 19/57* (2014.11); *H04N 19/20* (2014.11)

(58) Field of Classification Search
  CPC .............................. H04N 19/57; H04N 19/20
  See application file for complete search history.

(56) References Cited

U.S. PATENT DOCUMENTS

| 8,442,118 B2 | 5/2013 | Lee |
| 8,494,055 B2 | 7/2013 | Seong et al. |

(Continued)

FOREIGN PATENT DOCUMENTS

| JP | 2001086387 A | 3/2001 |
| JP | 2008139599 A | 6/2008 |

(Continued)

OTHER PUBLICATIONS

Xueming Qian et al., "Global Motion Estimation and its Applications", School of Electronic and Information Engineering, Xi'an Jiaotong University, Video Compression, Mar. 2012, pp. 83-101.

*Primary Examiner* — Tat Chi Chio
(74) *Attorney, Agent, or Firm* — Harness, Dickey & Pierce, P.L.C.

(57) ABSTRACT

An encoding system includes a motion estimation unit configured to receive a plurality of frames and motion data corresponding to the plurality of frames, the plurality of frames including a first frame and a second frame, the first frame being a reference frame to an encoding target frame and the second frame being the encoding target frame, the motion estimation unit further configured to generate a motion vector to indicate a positional relationship between a macroblock of the first frame and a target macroblock of the second frame, a motion compensation unit configured to compensate for a motion of the target macroblock of the second frame according to the motion vector, a transform and quantization unit configured to output transformed and quantized data transforming and quantizing the motion-compensated target macroblock of the second frame and an encoder configured to encode the transformed and quantized data and output the encoded data.

13 Claims, 14 Drawing Sheets

(56) References Cited

U.S. PATENT DOCUMENTS

| | | | |
|---|---|---|---|
| 8,934,544 B1* | 1/2015 | Wang | H04N 19/176 |
| | | | 375/240.13 |
| 2010/0079605 A1 | 4/2010 | Wang et al. | |
| 2011/0026585 A1* | 2/2011 | Watanabe | H04N 17/004 |
| | | | 375/240.2 |
| 2015/0123990 A1* | 5/2015 | Satoh | H04N 5/23248 |
| | | | 345/625 |
| 2017/0171543 A1* | 6/2017 | Moriya | H04N 19/107 |

FOREIGN PATENT DOCUMENTS

| KR | 1020070053402 A | 5/2007 |
|---|---|---|
| KR | 100767503 B1 | 10/2007 |
| KR | 1020080022843 A | 3/2008 |
| KR | 100837819 B1 | 6/2008 |
| KR | 101242560 B1 | 3/2013 |

* cited by examiner

FIG. 4
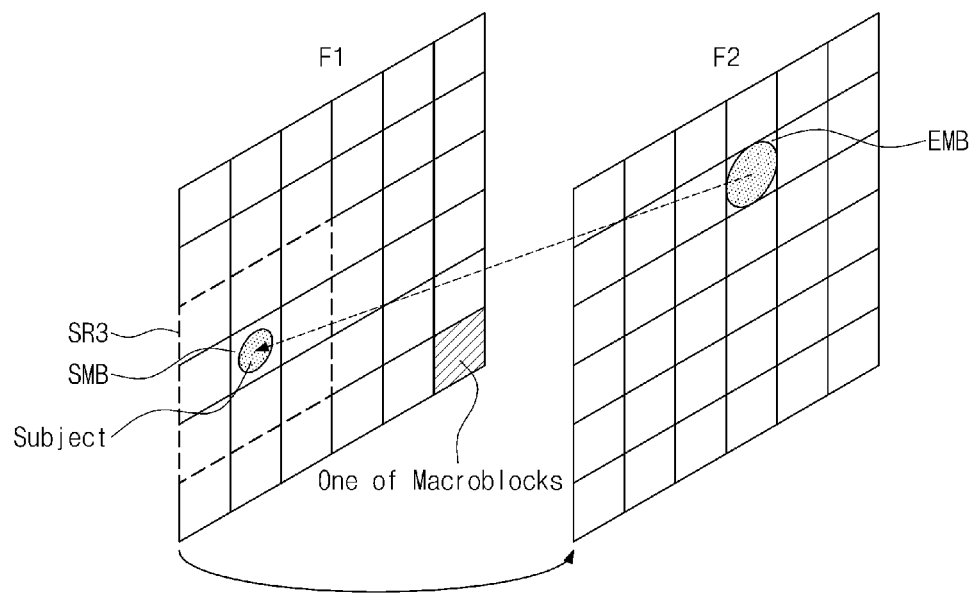
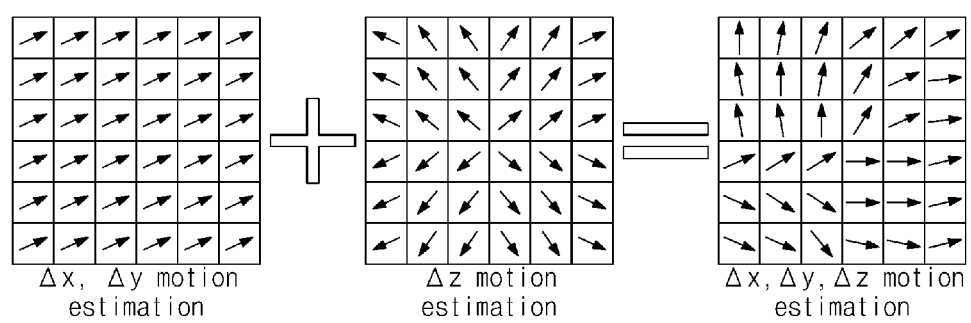

FIG. 5
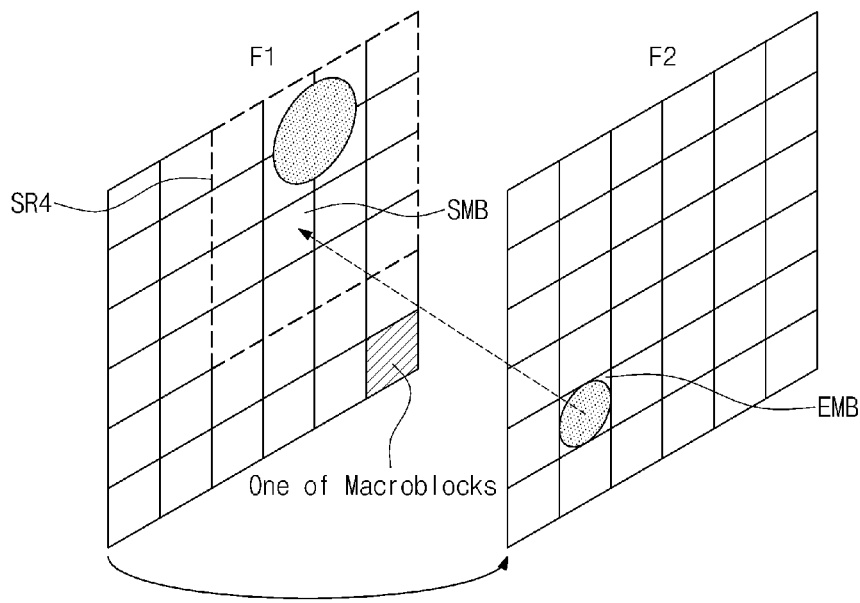
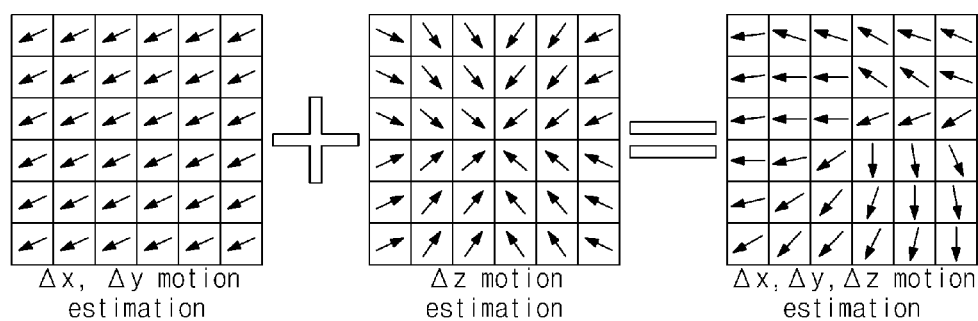

VIDEO FRAME ENCODING SYSTEM, ENCODING METHOD AND VIDEO DATA TRANSCEIVER INCLUDING THE SAME

CROSS-REFERENCE TO RELATED APPLICATIONS

This U.S. non-provisional patent application claims priority under 35 U.S.C. § 119 to Korean Patent Application No. 10-2014-0167307, filed on Nov. 27, 2014, the entirety of which is hereby incorporated by reference.

BACKGROUND

At least some example embodiments of inventive concepts relate generally to image processing such as an encoding system/circuit to encode data including video information, an encoding method, and a video data transmitting and receiving system including the encoding circuit.

Various image processing methods have been used to display images on electronic devices. For example, Moving Picture Experts Groups (MPEG) has released several standards including MPEG-1, MPEG-2, and MPEG-4. On the other hand, International Telecommunication Union (ITU) is using H.263, H.264/AVC, and the like as video encoding standards. According to these video encoding standards, image data are encoded in a compression format to enhance transmission efficiency of the image data.

In particular, as usage of high-definition images is increasing and high-speed transmission methods of high-capacity images have been used, image processing methods for compressing data to form images have been widely used. According to the image processing methods for compressing data to form images, data are converted by various mathematical techniques and the converted data are encoded by various encoding techniques.

In global motion estimation (GME) adopted by the MPEG-4 standard, application of a global motion vector or a local motion vector for each macroblock should be decided. Mathematical techniques used in GME encoding use many calculations.

SUMMARY

At least some example embodiments of inventive concepts provide an encoding system. In at least some example embodiments, the encoding system may include a motion estimation unit configured to receive a plurality of frames and x-axis, y-axis, and z-axis motion data corresponding to the plurality of frames, the plurality of frames including a first frame and a second frame, the first frame being a reference frame to an encoding target frame and the second frame being the encoding target frame, the motion estimation unit further configured to generate a motion vector to indicate a positional relationship between a macroblock of the first frame and a target macroblock of the second frame, a motion compensation unit configured to compensate for a motion of the target macroblock of the second frame according to the motion vector, a transform and quantization unit configured to output transformed and quantized data transforming and quantizing the motion-compensated target macroblock of the second frame and an encoder configured to encode the transformed and quantized data and output the encoded data. The motion estimation unit is configured to estimate x-axis, y-axis, and z-axis motions based on the x-axis, y-axis, and z-axis motion data, estimate one of expansion and contraction of a subject in the target macroblock of the second frame based on the z-axis motion, and adjust a search range of the first frame based on the estimation of the one of expansion and contraction.

In at least some example embodiments, the motion estimation unit is configured to set a search start macroblock of the first frame based on the x-axis, y-axis, and z-axis motions and adjust the search range based on the x-axis, y-axis and z-axis motions.

In at least some example embodiments, the motion estimation unit is configured to set the search start macroblock of the first frame by transforming the x-axis, y-axis, and z-axis motions into motions on a plane frame.

In at least some example embodiments, the motion estimation unit is configured to reduce the search range of the first frame if the motion estimation unit estimates expansion of the subject in the target macroblock of the second frame based on the z-axis motion.

In at least some example embodiments, the motion estimation unit is configured to increase the search range of the first frame is the motion estimation unit estimates contraction of the subject included in the estimation target macroblock of the second frame is estimated through the z-axis motion.

In at least some example embodiments, the encoding system may further include an inverse transform and inverse quantization unit configured to inversely transform and inversely quantize the transformed and quantized data, a filter configured to filter the inversely transformed and inversely quantized data and a frame store unit configured to store the filtered data.

In at least some example embodiments, the plurality of frames may further include a third frame being a second reference frame. The motion estimation unit is configured to estimate the x-axis, y-axis and z-axis motions for each of the first and third frames to encode the target macroblock of the second frame, and the motion estimation unit is configured to adjust the search range of the first frame and a search range of the third frame based on the z-axis motion.

In at least some example embodiments, the search range of each of the first and third frames may include a range varying based on the z-axis motion.

In at least some example embodiments, each of the first and third frames may be one of a previous frame and a subsequent frame of the second frame.

At least some example embodiments of inventive concepts provide an encoding method of an encoding system. In at least some example embodiments, the encoding method may include receiving a plurality of video frames including a first frame and a second frame, the first frame being a reference frame of an encoding target frame and the second frame being the encoding target frame, calculating movement distance of a subject in a target macroblock of the second frame from the first frame and a movement direction of the subject from based on the x-axis, y-axis, and z-axis motions, setting a search start macroblock of the first frame to search the subject included in the target macroblock of the second frame, adjusting a search range of the first frame based on the z-axis motion to perform motion estimation, performing motion estimation based on the adjusted search range, obtaining a motion vector based on the motion estimation and encoding the estimation target macroblock of the second frame using the motion vector.

In at least some example embodiments, further comprising: determining whether encoding of all macroblocks of the second frame is completed, wherein the calculating calculates the movement distance and the direction of the subject based on the determining.

In at least some example embodiments, the adjusting includes detecting the subject in the target macroblock of the second frame to be larger than in the first frame based on the z-axis motion, and reducing the search range of the first frame in proportion to a z-axis distance.

In at least some example embodiments, the adjusting includes detecting the subject in the target macroblock of the second frame to be smaller than in the first frame based on the z-axis motion, and increasing the search range of the first frame in proportion to a z-axis distance.

At least some example embodiments of inventive concepts provide a video data transceiver comprising a video encoder. In at least some example embodiments, the video encoder may include a motion estimation unit configured to estimate x-axis, y-axis, and z-axis motions corresponding to a plurality of frames including a first frame and a second frame, the first frame being a reference frame of an encoding target frame and the second frame being the encoding target frame, the motion estimation unit further configured to estimate expansion or contraction of a subject in a target macroblock of the second frame based on the z-axis motion, and further configured to generate a motion vector to indicate a positional relationship between a macroblock of the first frame and the target macroblock of the second frame by adjusting a search range of the first frame based on the estimated expansion or contraction, a motion compensation unit configured to compensate for a motion of the target macroblock of the second frame according to the motion vector, a transform and quantization unit configured to output transformed and quantized data by transforming and quantizing the motion-compensated target macroblock of the second frame and an encoder configured to encode the transformed and quantized data and output the encoded data.

In at least some example embodiments, the motion estimation unit is configured to receive x-axis, y-axis and z-axis motion data, x-axis, y-axis, and z-axis motion data may be measured by a gyrosensor.

At least another example embodiment discloses an encoding system including a motion estimation unit configured to receive a plurality of frames and motion data, the plurality of frames including at least a first frame and a second frame, the first frame being a reference frame for the second frame, the motion estimation unit being further configured to adjust a search range of the first frame based on a change in size of a subject in the first frame and the second frame and an encoder configured to encode the second frame based on the adjusted search range.

In an example embodiment, the motion estimation unit is configured to determine the change in size based on a z-axis motion.

In an example embodiment, the motion estimation unit is configured to generate a motion vector between a macroblock of the first frame and a macroblock of the second frame, the motion vector indicating a positional relationship between the subject in the first frame and the subject in the second frame.

In an example embodiment, the motion estimation unit is configured to adjust the search range further based on a change in the size of the subject in the second frame and a size of the subject in a third frame.

In an example embodiment, the first frame is a previous frame of the second frame and the third frame is a subsequent frame of the second frame.

In an example embodiment, the search range is adjusted by a search start macro block.

In an example embodiment, the video encoder is configured to operate according to a HEVC standard.

In an example embodiment, the video data transceiver is a graphic processing unit.

According to example embodiments of inventive concepts, an estimated movement position of each macroblock may be calculated using movement information of a photographing apparatus to adjust a size of a search range. Thus, an encoding system may improve encoding speed of image data and reduce power consumption.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain principles of the disclosure. In the drawings:

FIG. 4 illustrates a motion estimation method according to another example embodiment of inventive concepts;

FIG. 5 illustrates a motion estimation method according to another example embodiment of inventive concepts;

DETAILED DESCRIPTION

Figure 1:
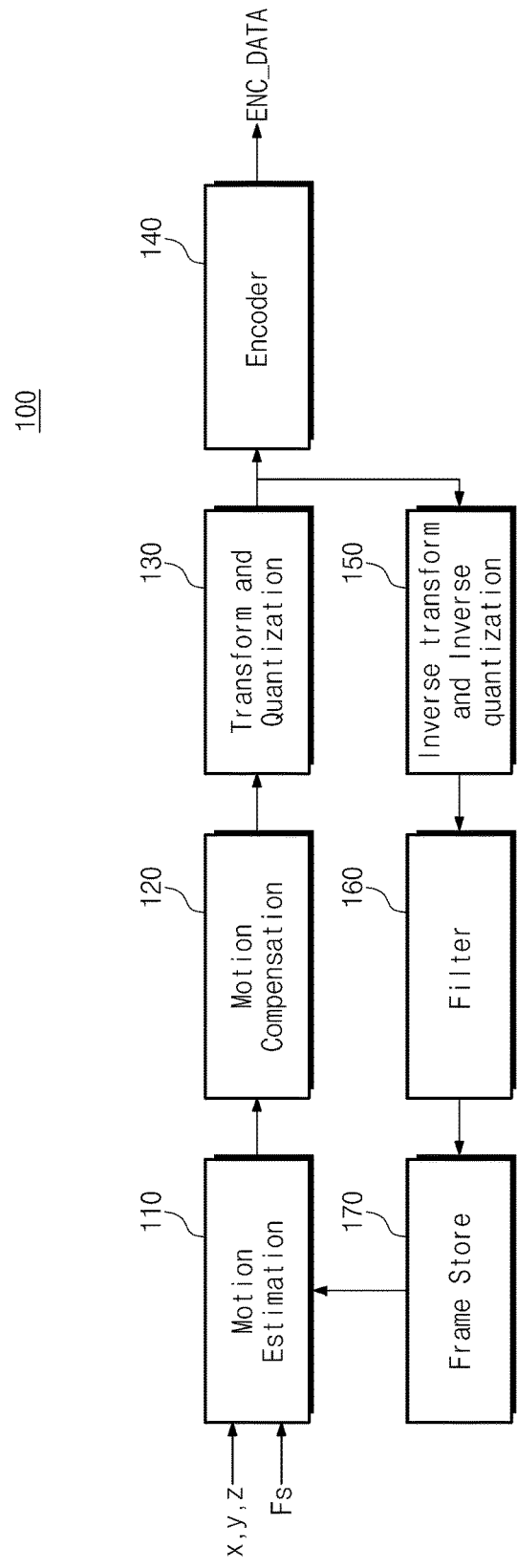
FIG. 1 is a block diagram of an encoding circuit according to an example embodiment of inventive concepts.

At least some example embodiments of inventive concepts will be described in detail with reference to the accompanying drawings. Inventive concepts, however, may be embodied in various different forms, and should not be construed as being limited only to the illustrated embodiments. Rather, example embodiments are provided as examples so that this disclosure will be thorough and complete, and will fully convey the concept of inventive concepts to those skilled in the art. Accordingly, known processes, elements, and techniques might not be described with respect to some of the example embodiments of inventive concepts. Like reference numerals may denote like elements throughout the attached drawings and written description.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an encoding circuit 100 according to an example embodiment of inventive concepts. The encoding circuit 100 may also be referred to as an encoding system. As illustrated, the encoding circuit 100 includes a motion estimation unit 110, a motion compensation unit 120, a transform and quantization unit 130, an encoder 140, an inverse transform and inverse quantization unit 150, a filter 160, and a frame store unit 170.

The term "unit" may include hardware and/or a special purpose computer programmed to perform the functions of the "unit." Therefore, the motion estimation unit 110, the motion compensation unit 120, the transform and quantization unit 130, the encoder 140, the inverse transform and inverse quantization unit 150, the filter 160, and the frame store unit 170 may be hardware, firmware, hardware executing software or any combination thereof. When at least one of the motion estimation unit 110, the motion compensation unit 120, the transform and quantization unit 130, the encoder 140, the inverse transform and inverse quantization unit 150, the filter 160, and the frame store unit 170 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the motion estimation unit 110, the motion compensation unit 120, the transform and quantization unit 130, the encoder 140, the inverse transform and inverse quantization unit 150, the filter 160, and the frame store unit 170. CPUs, DSPs, ASICs and FPGAs may generally be referred to as processors and/or microprocessors.

In the event where at least one of the motion estimation unit 110, the motion compensation unit 120, the transform and quantization unit 130, the encoder 140, the inverse transform and inverse quantization unit 150, the filter 160, and the frame store unit 170 is a processor executing software, the processor is configured as a special purpose machine to execute the software, stored in a storage medium, to perform the functions of the at least one of the motion estimation unit 110, the motion compensation unit 120, the transform and quantization unit 130, the encoder 140, the inverse transform and inverse quantization unit 150, the filter 160, and the frame store unit 170. In such an example embodiment, the processor may include one or more Central Processing Units (CPUs), digital signal processors (DSPs), application-specific-integrated-circuits (ASICs), field programmable gate arrays (FPGAs) computers.

The motion estimation unit 110 receives motion data x, y, and z and video frames Fs from an external device. The motion data x, y, and z may be received from a gyrosensor (not shown). The motion data x, y, and z include x-axis, y-axis, and z-axis motion information of a subject.

When the motion estimation unit 110 is encoding one of the received frames Fs, a candidate frame is called a current frame. A framed compared for motion estimation of the current frame is called a reference frame (e.g., a previous frame or a subsequent frame of the current frame). Inter-prediction may be performed by comparing the current frame with the reference frame. The motion estimation unit 110 may generate a motion vector to show a relationship between an estimation target macroblock of the current frame and a detected macroblock of the reference frame.

More specifically, the motion estimation unit 110 may generate a motion vector using the motion data x, y, and z. The motion estimation unit 110 may estimate an x-axis motion $\Delta x$ through the x-axis motion data x. The motion estimation unit 110 may estimate a y-axis motion $\Delta y$ through the y-axis motion data y. The motion estimation unit 110 may estimate an x-axis motion and a y-axis motion where a subject included in the estimation target macroblock of the current frame moves from the reference frame, through the x-axis motion $\Delta x$ and the y-axis motion $\Delta y$.

In addition, the motion estimation unit 110 estimates a z-axis motion $\Delta z$ through the z-axis motion data z. The motion estimation unit 110 may estimate a z-axis motion where the subject included in the macroblock of the current frame moves from the reference frame, through the z-axis motion $\Delta z$. The motion estimation unit 110 may estimate whether the subject included in the estimation target macroblock of the current frame is expanded or contracted, through the z-axis motion $\Delta z$.

The motion estimation unit 110 may adjust a search range to search the subject included in the estimation target macroblock of the current frame from a previous frame. In at least some example embodiments, when the subject included in the estimation target frame of the current frame is expanded to be larger than in the reference frame, the motion estimation unit 110 may contract the search range. Meanwhile, when the subject included in the estimation target macroblock of the current frame is contracted to be smaller than in the reference frame, the motion estimation unit 110 may expand the search range.

The motion estimation unit 110 may estimate x-axis and y-axis motions from a previous frame of the subject included in the estimation target macroblock of the current frame through the x-axis and y-axis motions $\Delta x$ and $\Delta y$. The motion estimation unit 110 may estimate whether the subject included in the estimation target macroblock of the current frame is expanded or contracted from the previous frame, through the z-axis motion $\Delta z$.

The motion compensation unit 120 may perform motion compensation through a motion vector. The motion compensation unit 120 may load a macroblock of the reference frame that the motion vector indicates. The macroblock of the reference frame may be output as a current frame.

The transform and quantization unit 130 may generate a differential block. For example, the differential block may include a value of difference between an estimation target macroblock of a current frame generated through inter-prediction and an image block of an original frame. The transform and quantization unit 130 transforms a transform coefficient of a frequency area with respect to the different block to remove correlation in the differential block. The transform may be DCT (Discrete Cosine Transform), DST (Discrete Sine Transform), Integer Transform or one of similar transforms. The transform and quantization unit 130 outputs data obtained by adaptively quantizing the differential block.

The encoder 140 compresses the output data. In at least some example embodiments, the encoder 140 may use at least one of arithmetic coding, differential coding, Huffman coding, run-length coding, LZ coding, and dictionary coding. The encoder 140 outputs compressed image data ENC_DATA.

The inverse transform and inverse quantization unit 150 receives inverted and quantized data from the transform and quantization unit 130. The inverse transform and inverse quantization unit 150 may restore data through an inverse transform and inverse quantization process.

The filter 160 may include a deblocking filter to eliminate noise included in a boundary between macroblocks of a current frame, a sample adaptive offset filter to compensate distortion between frames Fs of a video image and frames of restored data, an adaptive loop filter to compensate information loss that occurs during encoding in a high efficiency (HE) mode, and the like.

The frame store unit 170 may buffer reference frame information of the image frames Fs. The frame store unit 170 may buffer the current frame to a reference frame for use in motion estimation that occurs subsequently. The information buffered by the frame store unit 170 may be provided to the motion estimation unit 110. The information buffered by the frame store unit 170 may be used together with information of the current frame to perform inter-prediction.

Figure 2:
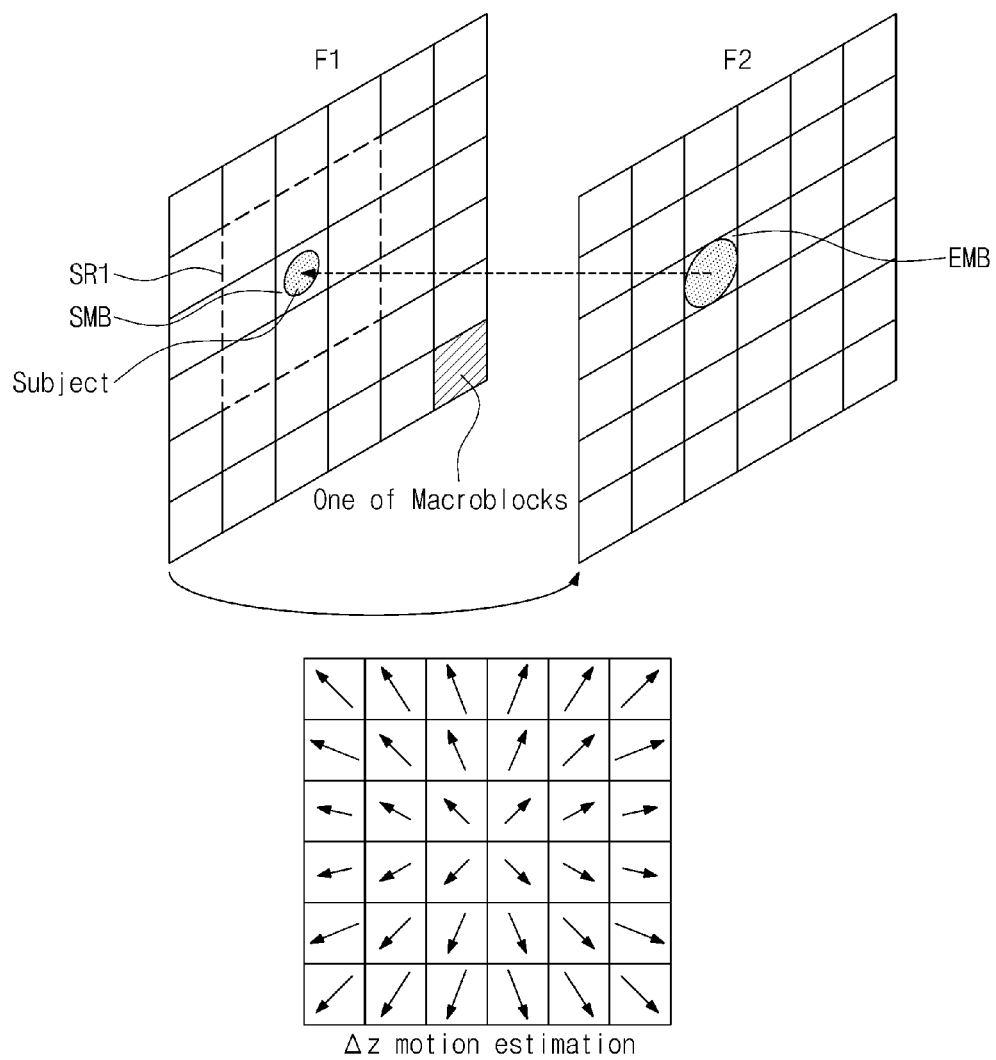
FIG. 2 illustrates a motion estimation method according to an example embodiment of inventive concepts.

FIG. 2 illustrates a motion estimation method according to an example embodiment of inventive concepts. Referring to FIGS. 1 and 2, motion estimation of the motion estimation unit 110 will be described by describing first and second frames F1 and F2. In at least some example embodiments, the first frame F1 is a reference frame (a previous frame or a subsequent frame of a current frame) and the second frame F2 is the current frame. The first and second frames F1 and F2 are divided into a plurality of macroblocks. For example each of the first and second frames F1 and F2 includes 6*6 macroblocks.

For the purpose of describing inventive concepts, a subject is expanded to the second frame F2 from the first frame F1 through a z-axis motion without x-axis and y-axis motions. The motion estimation unit 110 may estimate motions of subjects respectively included in macroblocks through $\Delta z$ motion estimation. For example, in FIG. 2, a subject of the second frame F2 is expanded to be larger than that of the first frame F1. With reference to the $\Delta z$ motion estimation, it may be confirmed that the subjects respectively included in the macroblocks move in an outward direction.

The motion estimation unit 110 estimates movement direction and distance through the z-axis motion $\Delta z$ and sets a search start macroblock SMB in the first frame F1. The motion estimation unit 110 estimates expansion of a subject through the z-axis motion $\Delta z$. Thus, the motion estimation unit 110 may adjust a first search range SR1 of the first frame F1 in proportion to a size of the subject. More specifically, the motion estimation unit 110 may estimate the expansion degree and the movement distance of the subject through the z-axis motion $\Delta z$ and reduce a size of the first search range SR1 according to the estimation.

Figure 3:
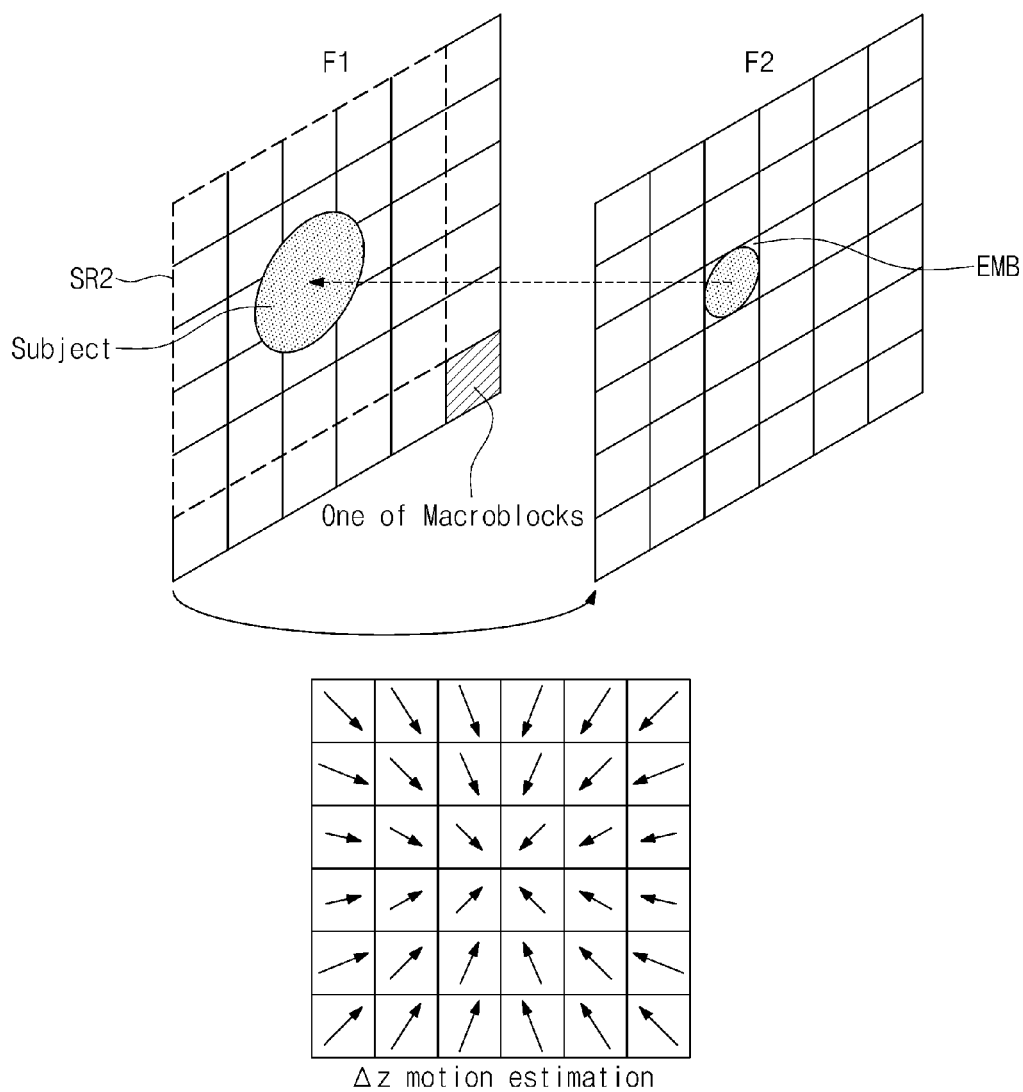
FIG. 3 illustrates a motion estimation method according to another example embodiment of inventive concepts.

FIG. 3 illustrates a motion estimation method according to another example embodiment of inventive concepts. In FIG. 3, a subject is contracted to a second frame F2 from a first frame F1 through a z-axis motion without x-axis and y-axis motions. Referring to FIGS. 1 and 3, the motion estimation unit 110 estimates a motion of the subject through $\Delta z$ motion estimation. With reference to the $\Delta z$ motion estimation, it may be confirmed that subjects respectively included in macroblocks move in an inward direction.

The motion estimation unit 110 sets a search start point using the z-axis motion $\Delta z$ to search the subject included in an estimation target macroblock EMB of the second frame F2 in the first frame F1. The motion estimation unit 110 estimates contraction of a subject through the z-axis motion $\Delta z$. Thus, the motion estimation unit 110 may adjust a second search range SR2 of the first frame F1 in proportion to a size of the subject. More specifically, the motion estimation unit 110 may estimate the contraction degree and the movement distance of the subject through the z-axis motion $\Delta z$ and increase a size of the second search range SR2 according to the estimation.

FIG. 4 illustrates a motion estimation method according to another example embodiment of inventive concepts. In FIG. 4, subjects included in a second frame F2 move to a right upper portion as compared to subjects included in the first frame F1 and are simultaneously expanded. More specifically, referring to FIGS. 1 and 4, the motion estimation unit 110 may estimate that subjects move to a right upper portion through $\Delta x$ motion estimation and $\Delta y$ motion estimation. At the same time, the motion estimation unit 110 may estimate that subjects are expanded through $\Delta z$ motion estimation. The motion estimation unit 110 may estimate the x-axis, y-axis, and z-axis motions $\Delta x$, $\Delta y$, and $\Delta z$ on a plane frame by combining the z-axis motion $\Delta z$ with the x-axis and y-axis motions $\Delta x$ and $\Delta y$.

The motion estimation unit 110 sets a search start macroblock SMB using the x-axis, y-axis, and z-axis motions $\Delta x$, $\Delta y$, and $\Delta z$ to search a subject included in an estimation target macroblock EMB of the second frame F2 in the first frame F1. The motion estimation unit 110 estimates expansion of the subject through the z-axis motion $\Delta z$. Thus, the motion estimation unit 110 may reduce a third search range SR3 of the first frame F1 in proportion to the z-axis motion Δz.

FIG. 5 illustrates a motion estimation method according to another example embodiment of inventive concepts. In FIG. 5, subjects included in a second frame F2 move to a left lower portion as compared to subjects included in a first frame F1 and are simultaneously contracted. More specifically, referring to FIGS. 1 and 5, the motion estimation unit 110 may estimate that subjects move to a left lower portion through Δx and Δy motion estimations. At the same time, the motion estimation unit 110 may estimate that the subjects are contracted through Δz motion estimation. The motion estimation unit 110 estimates Δx, Δy, and Δz motions on a plane frame by combining the z-axis motion Δz with the x-axis and y-axis motions Δx and Δy.

The motion estimation unit 110 sets a search start macroblock SMB using the estimated x-axis, y-axis, and z-axis motions Δx, Δy, and Δz to search a subject included in an estimation target macroblock EMB of the second frame F2 in the first frame F1. The motion estimation unit 110 estimates expansion of the subject through the estimated z-axis motion Δz. Thus, the motion estimation unit 110 may increase a fourth search range SR4 of the first frame F1 in proportion to the z-axis motion Δz.

Figure 6:
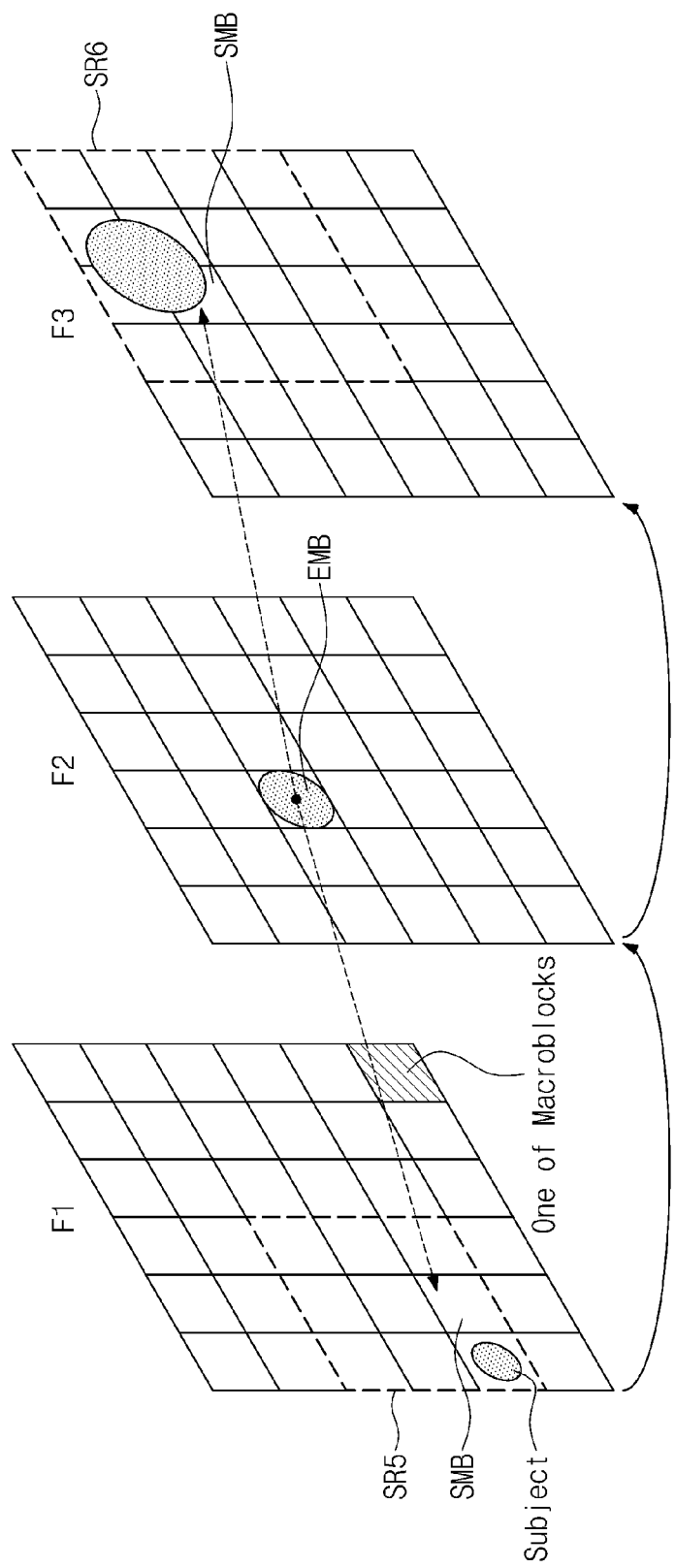
FIG. 6 illustrates a motion estimation method according to another example embodiment of inventive concepts.

FIG. 6 illustrates a motion estimation method according to another example embodiment of inventive concepts. Referring to FIGS. 1 and 6, motion estimation of the motion estimation unit 110 will be described using first, second, and third frames F1, F2, and F3. For example, the first and third frames F1 and F3 are reference frames (which are a previous frame and a subsequent frame of a current frame, respectively) and the second frame F2 is the current frame that is an encoding target. The first to third frames F1, F2, and F3 are divided into a plurality of macroblocks. In FIG. 6, each of the first to third frames F1, F2, and F3 includes 6*6 macroblocks, but is not limited thereto.

Referring to FIG. 6, the first and third frames F1 and F3 are compared with the second frame F2 to encode an estimation target macroblock EMB of the second frame F2. The motion estimation unit 110 may estimate that subjects move sequentially to a right upper portion with the movement from the first frame F1 to the third frame F3, through Δx motion estimation and Δy motion estimation. At the same time, the motion estimation unit 110 estimates that the subjects are sequentially expanded with the movement from the first frame F1 to the third frame F3, through the Δz motion estimation. The motion estimation unit 110 may estimate x-axis, y-axis, and z-axis motions Δx, Δy, and Δz on a plane frame by combining the z-axis motion Δz with the x-axis and y-axis motions Δx and Δy.

A subject included in an estimation target macroblock EMB of the second frame F2 is expanded to be larger than in the first frame F1 and moves to a right upper portion. A subject included in an estimation target macroblock EMB of the second frame F2 may be further expanded in the third frame F3 and moves to a right upper portion. The motion estimation unit 110 sets a motion estimation start macroblock SMB to each of the first and third frames F1 and F3 through the x-axis, y-axis, and z-axis motions Δx, Δy, and Δz to search a subject included in the estimation target macroblock EMB in the first and third frames F1 and F3.

The motion estimation unit 110 estimates that a subject has a relatively smaller size in the first frame F1 than in the second frame F2, through the z-axis motion Δz. Thus, the motion estimation unit 110 may reduce a fifth search range SR5 of the first frame F1 in proportion to the z-axis motion Δz.

The motion estimation unit 110 estimates that the subject has a relatively larger size in the third frame F3 than in the second frame F2, through the z-axis motion Δz. Thus, the motion estimation unit 110 may increase a sixth search range SR6 of the third frame in proportion to the z-axis motion Δz.

A fifth search range SR5 has a narrower range than the sixth search range SR6. The motion estimation unit 110 searches the subject included in the estimation target macroblock EMB of the second frame to obtain motion vectors in the fifth search range SR5 and the sixth search range SR6. The motion estimation unit 110 performs an encoding operation using a higher-accuracy motion vector of the motion vectors obtained in the fifth search ranges SR5 and the sixth search range SR6.

Figure 7:
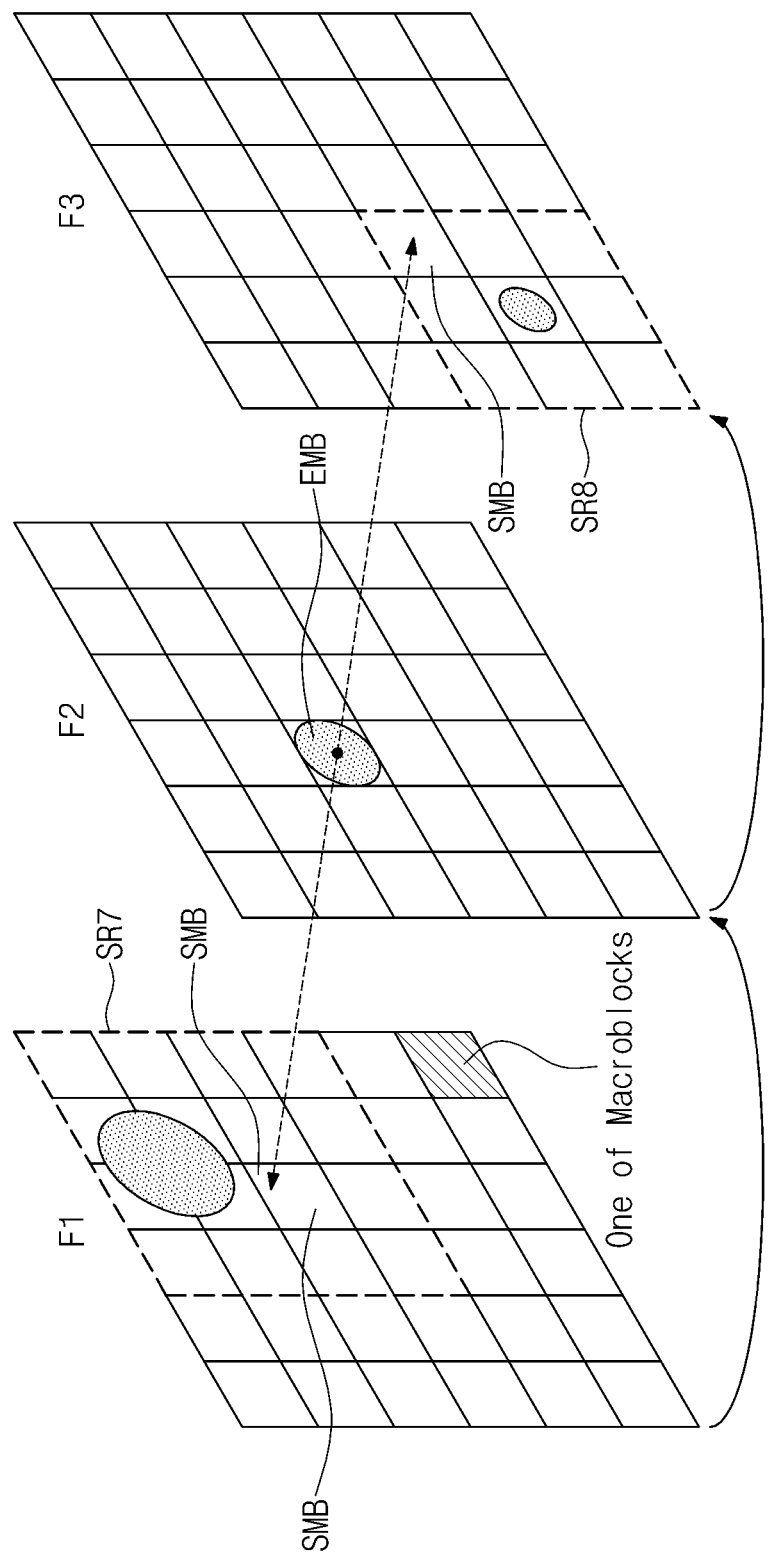
FIG. 7 illustrates a motion estimation method according to another example embodiment of inventive concepts.

FIG. 7 illustrates a motion estimation method according to another example embodiment of inventive concepts. Referring to FIGS. 1 to 7, motion estimation of the motion estimation unit will be described using first, second, and third frames F1, F2, and F3.

Referring to FIG. 7, the first frame F1 and the third frame F3 are compared with the second frame F2 to encode an estimation target macroblock EMB of the second frame F2. The motion estimation unit 110 may estimate that subjects move to a left lower portion, through Δx motion estimation and Δy motion estimation. At the same time, the motion estimation unit 110 may estimate that a subject is contracted, through Δz motion estimation. The motion estimation unit 110 may estimate x-axis, y-axis, and z-axis motions Δx, Δy, and Δz by combining the z-axis motion Δz with the x-axis and y-axis motions Δx and Δy.

A subject included in an estimation target macroblock EMB of the second frame F2 is contracted to be smaller than in the first frame F1 and moves to a left lower portion. A subject included in an estimation target macroblock EMB of the second frame F2 is further contacted in the third frame F2 and moves to the left lower portion. The motion estimation unit 110 sets a motion estimation start macroblock SMB to the first and third frames F1 and F3 through the x-axis, y-axis, and z-axis motions Δx, Δy, and Δz to search the subject included in the estimation target macroblock EMB of the second frame F2 in the first and third frames F1 and F3.

The motion estimation unit 110 estimates that a subject is relatively larger in the first frame F1 than in the second frame F2, through the z-axis motion Δz. Thus, the motion estimation unit 110 may increase a seventh range SR7 of the first frame F1 in proportion to the z-axis motion Δz.

The motion estimation unit 110 estimates that a subject has a relatively smaller size in the frame F3 than in the frame F2, through the z-axis motion Δz. Thus, the motion estimation unit 110 may reduce an eighth search range SR8 of the third frame F3 in proportion to the z-axis motion Δz.

A seventh search range SR7 has a wider range the eighth search range SR8. The motion estimation unit 110 searches the subject included in the estimation target macroblock EMB of the second frame F2 to obtain motion vectors in the seventh search range SR7 and the eighth search range SR8. The motion estimation unit 110 performs an encoding operation using a higher-accuracy motion vector of the motion vectors obtained in the seventh search ranges SR7 and the eighth search range SR8.

Figure 8:
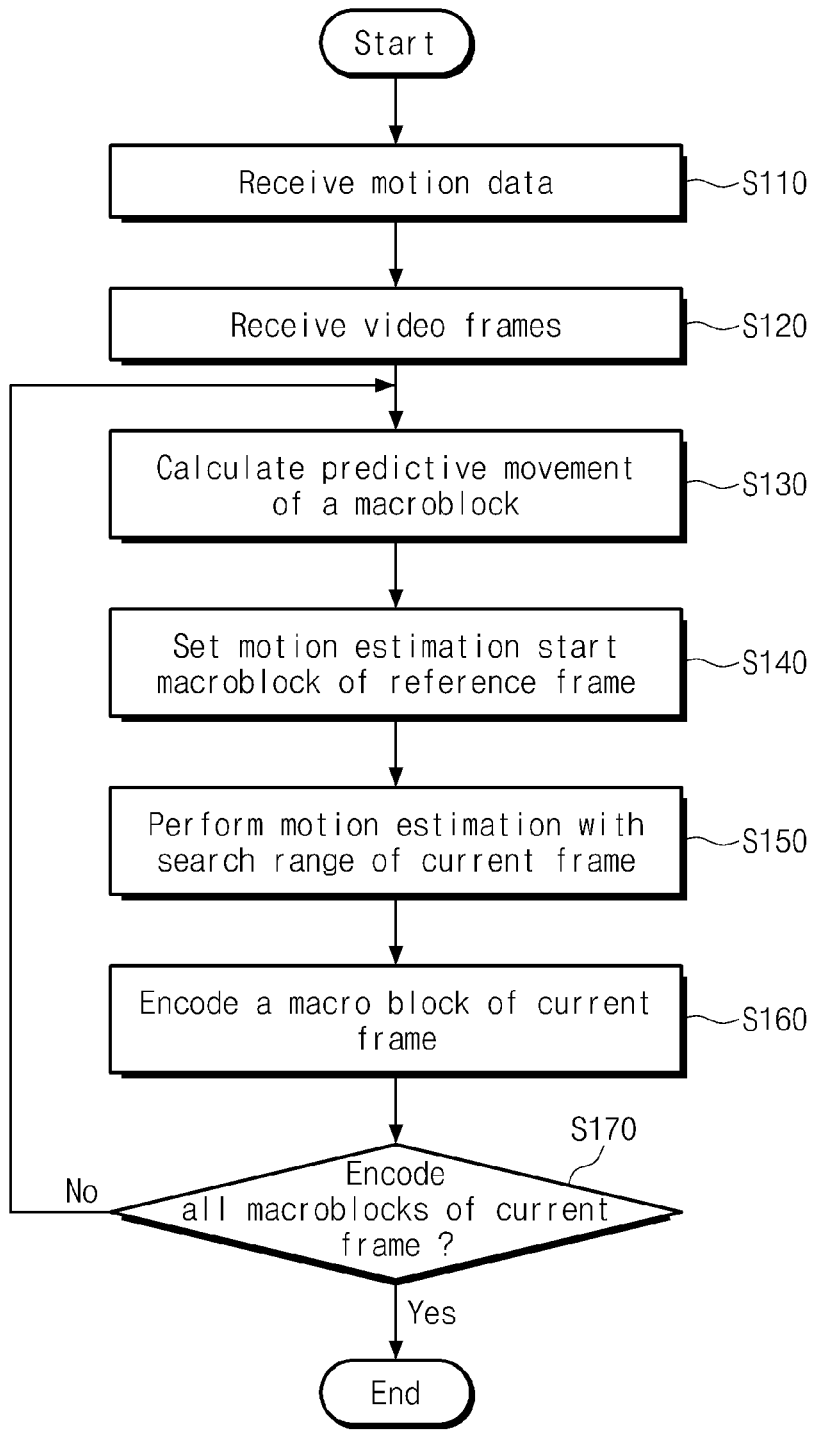
FIG. 8 is a flowchart a motion estimation method according to an example embodiment of inventive concepts.

FIG. 8 is a flowchart a motion estimation method according to an example embodiment of inventive concepts. Referring to FIGS. 1 and 8, the motion estimation unit 110 receives motion data (S110). The motion data is information on x-axis, x-axis, and z-axis movement of subjects included in a plurality of video frames Fs. The motion estimation unit 110 estimates x-axis, y-axis, and z-axis motions Δx, Δy, and Δz using motion data x, y, and z. The motion estimation unit 110 receives the video frames Fs (S120).

An estimation motion of a macroblock of a current frame, which is an encoding target, is calculated (S130). More specifically, the motion estimation unit 110 estimates movement distance and direction from a reference frame of a subject included in an estimation target macroblock. The motion estimation unit 110 calculates the x-axis, y-axis, and z-axis motions Δx, Δy, and Δz as movement direction and distance on a plane frame to estimate a motion of the subject included in the estimation target macroblock of the current frame.

The motion estimation unit 110 sets a motion estimation start macroblock of a reference frame (S140). More specifically, the motion estimation unit 110 sets a macroblock SMB to start motion estimation in the reference frame using information of the x-axis, y-axis, and z-axis motions Δx, Δy, and Δz calculated as the movement direction and distance on the plane frame.

The motion estimation unit 110 sets a search range of the reference frame to estimate a motion (S150). More specifically, the motion estimation unit 110 sets the search range on the basis of the motion estimation start macroblock set to the reference frame. The motion estimation unit 110 estimates image data that is identical to the subject included in the estimation target macroblock of the current frame within the search range. The motion estimation unit 110 may generate a motion vector by comparing the current frame with the reference frame.

The encoder 140 encodes the estimation target macroblock of the current frame (S160). The encoding circuit 100 determines whether encoding of all macroblocks of the current frame is completed (S170). When encoding of all the macroblocks of the current frame is not completed, the flow returns to S130 to encode an unencoded block.

Figure 9:
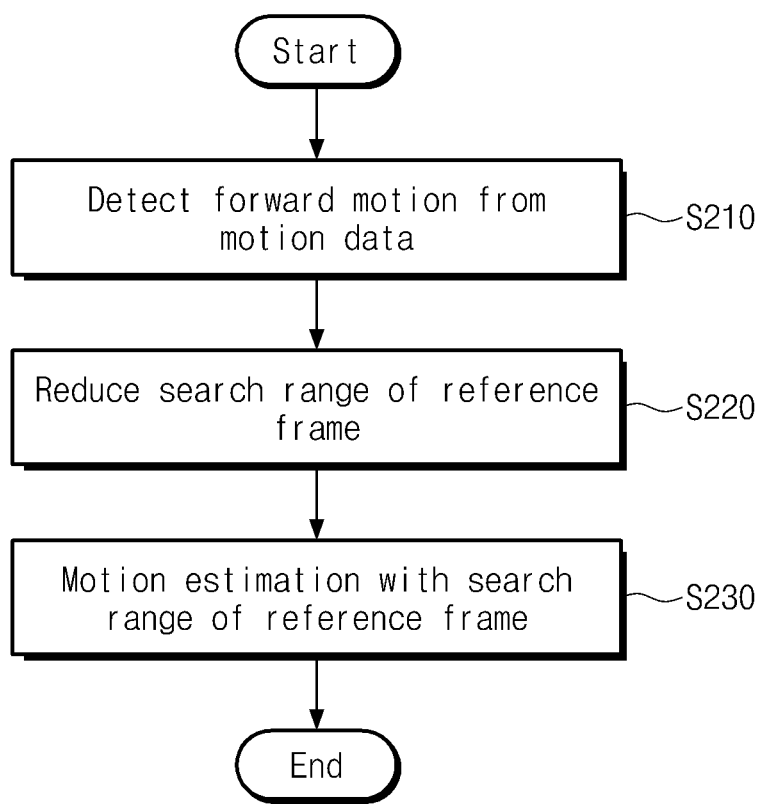
FIG. 9 is a flowchart a method for adjusting a search range according to an example embodiment of inventive concepts.

FIG. 9 is a flowchart a method for adjusting a search range according to an example embodiment of inventive concepts. Referring to FIGS. 1 to 9, the motion estimation unit 110 detects a forward motion from motion data (S210). More specifically, the motion estimation unit 110 receives z-axis motion data z and estimates a z-axis motion Δz to detect the forward motion. Thus, the subject included in an estimation target macroblock of a current frame is expanded to be larger than in a reference frame.

The motion estimation unit 110 sets a reduced search range of the reference frame (S220). The motion estimation unit 110 detects that subjects included in the estimation target macroblock of the current frame are expanded to be larger in size than in the reference frame. Thus, the subject included in the estimation target macroblock of the current frame may have a smaller size in the reference frame. The motion estimation unit 110 may detect the degree of expanding the subject included in the estimation target macroblock of the current frame from the reference frame through the z-axis motion Δz and reduce the search range according to the detection.

The motion estimation unit 110 may estimate a motion based on the set search range of the reference frame (S230). More specifically, the motion estimation unit 110 estimates image data that is identical to the subject included in the estimation target macroblock of the current frame within the search range. The motion estimation unit 110 may generate a motion vector by comparing the current frame with the reference frame.

Figure 10:
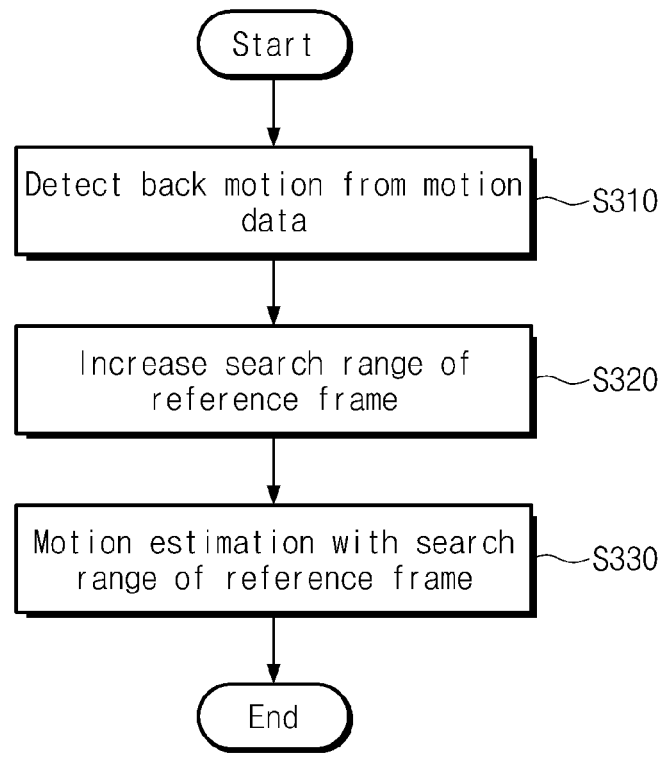
FIG. 10 is a flowchart a method for adjusting a search range according to another example embodiment of inventive concepts.

FIG. 10 is a flowchart a method for adjusting a search range according to another example embodiment of inventive concepts. The motion estimation unit 110 detects a backward motion from motion data (S310). More specifically, the motion estimation unit 110 receives z-axis motion data z and estimates a z-axis motion Δz to detect the backward motion. Thus, subjects included in an estimation target macroblock of the current frame are contracted to be smaller than in a reference frame.

The motion estimation unit 110 sets to increase a search range of the reference frame (S320). The motion estimation unit 110 detects that the subjects included in an estimation target macroblock of the current frame are contracted to be smaller than in the reference frame. Thus, the subject included in an estimation target macroblock of the current frame may have a larger size in the reference frame. The motion estimation unit 110 may detect the degree of contracting the subject included in an estimation target macroblock of the current frame from the reference frame and increase the search range according to the detection.

The motion estimation unit 110 estimates a motion based on the set search range of the reference frame (S330). More specifically, the motion estimation unit 110 estimates image data that is identical to the subject included in the estimation target macroblock of the current frame within the search range. The motion estimation unit 110 may generate a motion vector by comparing the current frame with the reference frame.

Figure 11:
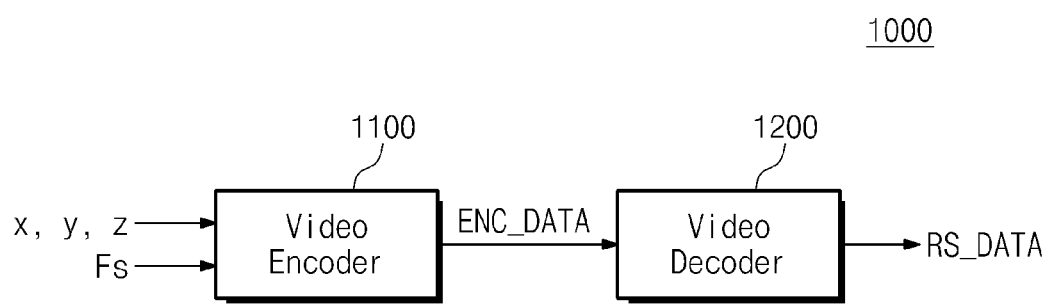
FIG. 11 is a block diagram of a video data transmitting and receiving system according to an example embodiment of inventive concepts.

FIG. 11 is a block diagram of a video data transmitting and receiving system 1000 according to an example embodiment of inventive concepts. The video data transmitting and receiving system 1000 may be an application processor and may be generally referred to as a transceiver. Alternatively, the video data transmitting and receiving system 1000 may be a graphic processing unit. In at least some example embodiments, the video data transmitting and receiving system 1000 may operate according to HEVC standard. Referring to FIGS. 1 to 11, the video data transmitting and receiving system 1000 may include a video encoder 1100 and a video decoder 1200.

The video encoder 1100 receives motion data x, y, and z and a plurality of video frames Fs. The video encoder 1100 encodes the frames Fs based on the motion data x, y, and z. The video encoder 1100 outputs encoded data ENC_DATA.

The video decoder 1200 receives the encoded data ENC_DATA. The video decoder 1200 decodes the encoded data ENC_DATA to output restored data RS_DATA. The video encoder 1100 and the video decoder 1200 will be described below in further detail with reference to FIGS. 12 and 13.

Figure 12:
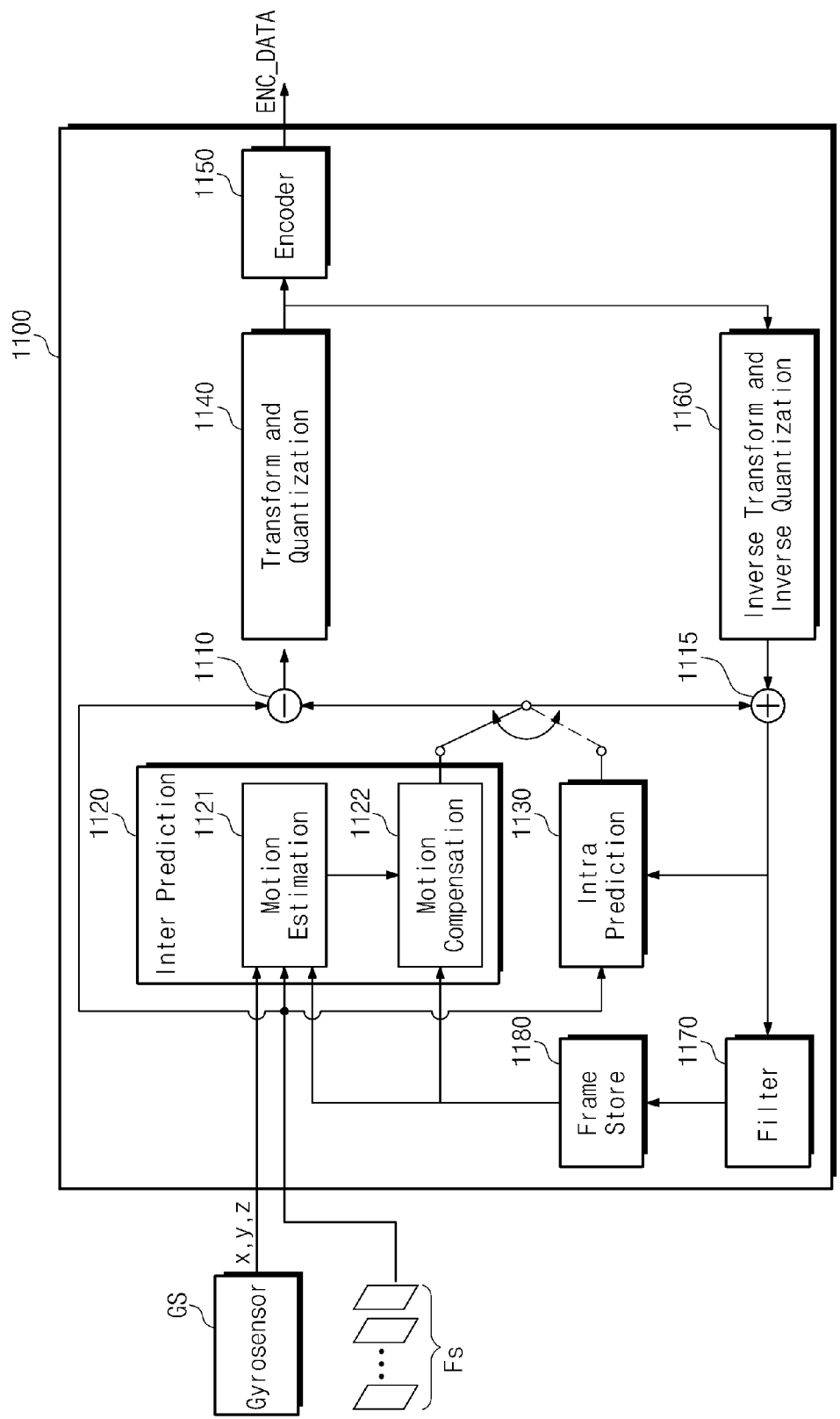
FIG. 12 is a block diagram of a video encoder in a video data transmitting and receiving system according to an example embodiment of inventive concepts.

FIG. 12 is a block diagram of a video encoder 1100 in a video data transmitting and receiving system according to an example embodiment of inventive concepts. The video encoder 1100 may include the encoding circuit 100 in FIG. 1. As illustrated, the video encoder 1100 may include a subtracter 1110, an adder 1115, an inter-prediction unit 1120, an intra-prediction unit 1130, a transform and quantization unit 1140, an encoder 1150, an inverse transform and inverse quantization unit 1160, a filter 1170, and a frame store unit 1180.

The subtracter 1110 externally receives a plurality of image frames Fs. The subtracter 1110 calculates and outputs a difference between macroblocks of the input image frames Fs and macroblocks of predictive data provided from a motion compensation unit 1122.

The inter-prediction unit 1120 includes a motion estimation unit 1121 and the motion compensation unit 1122. The motion estimation unit 1121 receives motion data x, y, and z from a gyrosensor GS. The gyrosensor GS may detect a motion of a video photographing apparatus (not shown) or a user's motion and generate motion data x, y, and z according to the detection. The motion estimation unit 1121 externally receives the image frames Fs. The motion estimation unit 1121 may perform inter-prediction by comparing a current frame with a reference frame (e.g., a previous frame or a subsequent frame of the current frame). The motion estimation unit 1121 may generate a motion vector to indicate a position relationship between an estimation target macroblock of the current frame and the detected macroblock.

More specifically, the motion estimation unit 1121 may generate a motion vector using the motion data x, y, and z received from the gyrosensor GS. The motion estimation unit 1121 generates x-axis, y-axis, and z-axis motions $\Delta x$, $\Delta y$, and $\Delta z$ using the motion data x, y, and z. Thus, the motion estimation unit 1121 may estimate x-axis, y-axis, and z-axis motions moving from a reference from of a subject included in an estimation target macroblock of the current frame.

The motion estimation unit 1121 may estimate whether the subject included in the estimation target macroblock of the current frame is expanded or contracted, through the z-axis motion. The motion estimation unit 1121 may adjust a search range for searching the subject included in the estimation target macroblock of the current from the reference frame, through the z-axis motion $\Delta z$. In at least some example embodiments, when the subject included in the estimation target macroblock of the current is expanded to be larger than an image in the reference frame, the motion estimation unit 1121 may reduce the search range. When the subject included in the estimation target macroblock of the current is contracted to be smaller than an image in the reference frame, the motion estimation unit 1121 may increase the search range.

The motion estimation unit 1121 may estimate a horizontal-axis motion and a vertical-axis motion as well expansion or contraction from a previous frame of the subject included in the estimation target macroblock of the current, through the x-axis, y-axis, and z-axis motions $\Delta x$, $\Delta y$, and $\Delta z$.

The motion compensation unit 1122 may obtain predictive data detected by inter-prediction from the motion estimation unit 1121. The motion compensation unit 1122 may load a macroblock of the reference frame indicated by a motion vector and output the loaded macroblock to the current frame.

The intra-prediction unit 1130 may obtain predictive data on the estimation target macroblock of the current frame using a macroblock adjacent to the estimation target macroblock of the current frame. That is, intra-prediction may be performed based on macroblocks included in a single frame. At least one of the predictive data obtained by the intra-prediction and the predictive data obtained by inter-prediction may be selectively provided to the adder 1115.

The adder 1115 may add data restored by the inverse transform and inverse quantization unit 1160 to predictive data. Thus, the adder 1115 may output data corresponding to original data.

The transform and quantization unit 1140 receives data from the subtracter 1110 and transforms the received data into a transform coefficient of a frequency area to remove correlation in a frame. The transform may be DCT (Discrete Cosine Transform), DST (Discrete Sine Transform), Integer Transform or one of similar transforms. The transform and quantization unit 1140 adaptively quantizes data obtained by compressing image data.

The encoder 1150 compresses an output of the transform and quantization unit 1140. In at least some example embodiments, the encoder 1150 may use arithmetic coding, differential coding, Huffman coding, run-length coding, LZ coding or dictionary coding. The encoder 1150 outputs the compressed image data as encoded data ENC_DATA.

The inverse transform and inverse quantization unit 1160 may process the data output from the transform and quantization unit 1140. The inverse transform and inverse quantization unit 1160 inversely quantizes and inversely transforms data output from the transform and quantization unit 1140 before outputting the output data.

The filter 1170 may include a deblocking filter to eliminate noise included in a boundary between macroblocks of a current frame, a sample adaptive offset filter to compensate distortion between frames Fs of a video image and frames of restored data, an adaptive loop filter to compensate information loss that occurs during encoding in a high efficiency (HE) mode, and the like.

The frame store unit 1180 may buffer reference frame information of an original image. The reference frame information buffered by the frame store unit 1180 may be provided to the motion estimation unit 1121. The reference frame information buffered by the frame store unit 1180 may be used together with information of the current frame to perform inter-prediction.

The motion estimation unit 1121, the motion compensation unit 1122, the transform and quantization unit 1140, the encoder 1150, the inverse transform and inverse quantization unit 1160, the filter 1170, and the frame store unit 1180 shown in FIG. 12 may include configurations and functions of the motion estimation unit 110, the motion compensation unit 120, the transform and quantization unit 130, the encoder 140, the inverse transform and inverse quantization unit 150, the filter 160, and the frame store unit 170 shown in FIG. 1.

Figure 13:
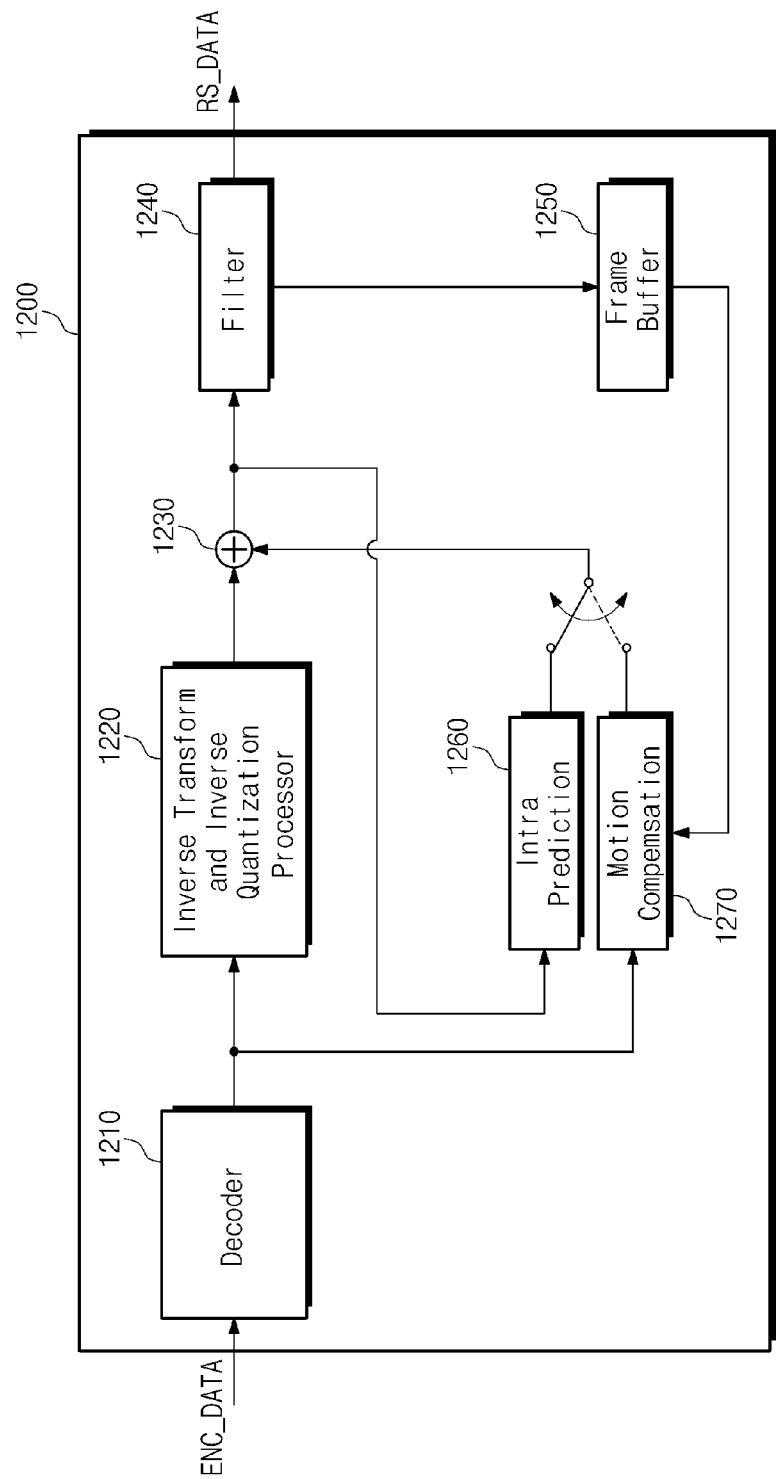
FIG. 13 is a block diagram illustrating the configuration of a video decoder corresponding to a video encoder according to an example embodiment of inventive concepts.

FIG. 13 is a block diagram illustrating the configuration of a video decoder 1200 corresponding to a video encoder according to an example embodiment of inventive concepts. In at least some example embodiments, the video decoder 1200 may operate according to HEVC standard. As illustrated, the video decoder 1200 may include a decoder 1210, an inverse transform and inverse quantization processor 1220, an adder 1230, a filter 1240, a frame store 1250, an inter-prediction unit 1260, and a motion compensation unit 1270.

The decoder 1210 may receive encoded video data ENC_DATA. The encoder 1210 may decode the encoded video data ENC_DATA. The inverse transform and inverse quantization processor 1220 may process data decoded by the decoder 1210.

The configurations and functions of the filter 1240 and the frame store 1250 are similar to those of the filter 1170 and the frame store unit 1180, respectively. The configurations and functions of the intra-prediction unit 1260 and the motion compensation unit 1270 are similar to those of the intra-prediction unit 1130 and the motion compensation unit 1122 in FIG. 12, respectively. The configurations and functions of the filter 1240, the frame store 1250, the intra-prediction unit 12620, and the motion compensation unit 1270 will not be described in further detail.

The filter 1240 may output restored data RS_DATA. An image may be displayed based on the restored data RS_DATA. The video transmitting and receiving system 1000 may provide the restored data RS_DATA, a control signal, and the like to a display device. Thus, a user may watch a displayed image.

Figure 14:
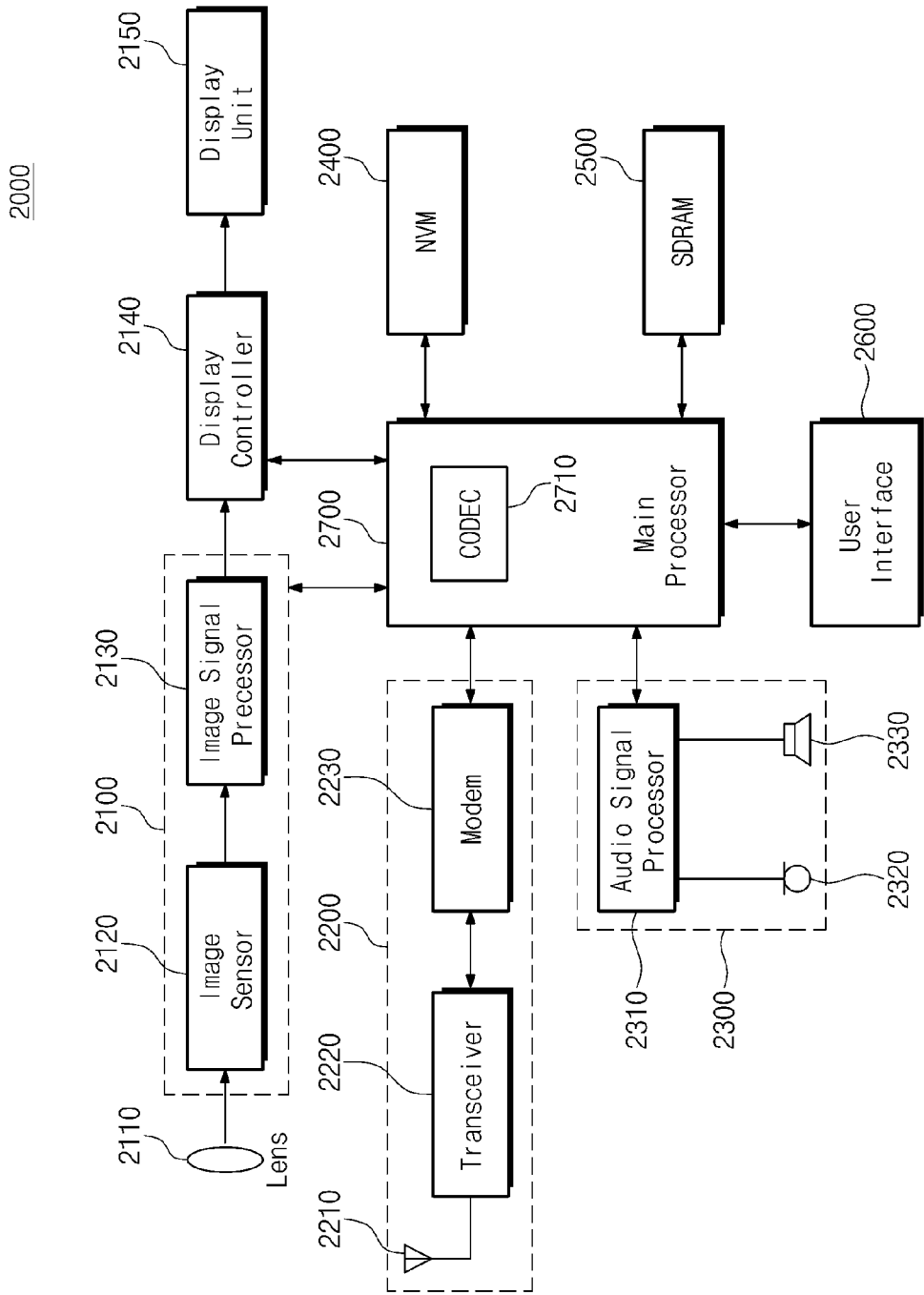
FIG. 14 is a block diagram illustrating the configuration that a handheld device including a video codec according to an example embodiment of inventive concepts may have.

FIG. 14 is a block diagram illustrating a configuration that a handheld device 2000 including a video codec according to an example embodiment of inventive concepts may have. The handheld device 2000 may be one of a mobile terminal, a portable personal assistant (PDA), a personal multimedia player (PMP), a smartphone, and a table computer. As illustrated, the handheld device 2000 may include an image processing unit 2100, a wireless communication unit 2200, an audio processing unit 2300, a nonvolatile memory 2400, a synchronous dynamic random access memory (SDRAM) 2500, a user interface 2600, and a main processor 2700.

The image processing unit 2100 may receive light through a lens 2110. An image sensor 2120 and an image signal processor 2130 included in the image processing unit 2100 may generate an image using the received light. The generated image may be displayed on a display unit 2150 according to the control of a display controller 2140. In at least some example embodiments, the display unit 2150 may be one of a liquid crystal display (LCD), an organic light-emitting diode (OLED) display, an active matrix OLED (AMOLED) display, and an LED display.

The wireless communication unit 2200 may include an antenna 2210, a transceiver 2220, and a modem 2230. The wireless communication unit 2200 may communicate with an external entity of the handheld device 2000 according to various wireless communication protocols LTE (Long Term Evolution), WiMax, GSM (Global System for Mobile communication), CDMA (Code Division Multiple Access), Bluetooth, NFC (Near Field Communication), WiFi, and RFID (Radio Frequency Identification).

The audio processing unit 2300 may process an audio signal using an audio signal processor 2310, a microphone 2320, and a speaker 2330. The nonvolatile memory 2400 may store data required to be retained. In at least some example embodiments, the nonvolatile memory 2400 may be a NAND-type flash memory, a phase-change RAM (PRAM), a magneto-resistive RAM (MRAM), a resistive RAM (ReRAM), a ferroelectric RAM (FRAM) or a NOR-type flash memory. Alternatively, the nonvolatile memory 2400 may include heterogeneous memories. The SDRAM 2500 may temporarily store data used to operate the handheld device 2000. The SDRAM 2500 may be used as a processing memory, a buffer memory or the like of the handheld device 2000.

The user interface 2600 may communicate with a user according to the control of a main processor 2700. For example, the user interface device 2600 may include user input interfaces such as a keyboard, a keypad a button, a touch panel, a touch screen, a touch ball, a touch pad, a camera, a gyroscope sensor, and a vibration sensor. In addition, the user interface device 2600 may include user output interfaces such a display device and a motor.

The main processor 2700 may control the overall operation of the handheld device 2000. The image processing unit 2100, the wireless communication unit 2200, the audio processing unit 2300, the nonvolatile memory 2400, and the SDRAM 2500 may execute a user command provided through the user interface 2600 according to the control of the main processor 2700. Alternatively, the image processing unit 2100, the wireless communication unit 2200, the audio processing unit 2300, the nonvolatile memory 2400, and the SDRAM 2500 may provide information to a user through the user interface 2600 according to the control of the main processor 2700.

The main processor 2700 may be implemented using a system-on-chip (SoC). In at least some example embodiments, the main processor 2700 may be an application processor. The main processor 2700 may include a video codec 2710 to encode or decode video information. The video codec 2710 may be implemented in the form of software, hardware or hybrid.

In the example embodiment shown in FIG. 14, the main processor 2700 and the video codec 2710 may be implemented based on inventive concepts described with reference to FIGS. 1 to 11. In particular, the main processor 2700 may encode a plurality of macroblocks included in a frame through x-axis, y-axis, and z-axis motion $\Delta x$, $\Delta y$, and $\Delta z$ estimation according to a motion of the handheld device 2000. Accordingly, inventive concepts may be implemented by the main processor 2700 in the handheld device 200.

Figure 15:
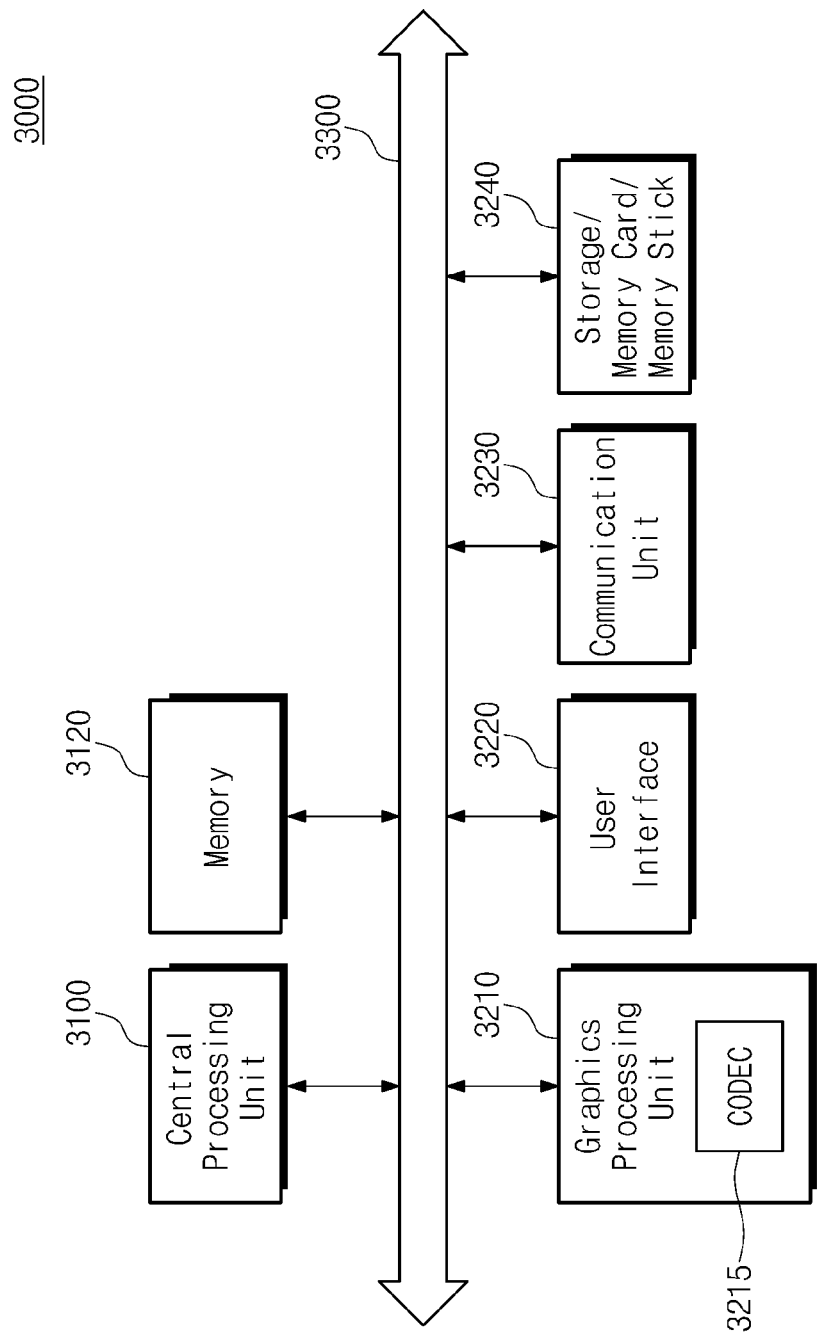
FIG. 15 is a block diagram illustrating the configuration that a computing system including a video codec according to an example embodiment of inventive concepts may have.

FIG. 15 is a block diagram illustrating the configuration that a computing system 3000 including a video codec according to an example embodiment of inventive concepts may have. As illustrated, the computing system 3000 may include a central processing unit (CPU) 3100, a memory 3120, a graphics processing unit 3210, a user interface 3220, a communication unit 3230, a storage unit 3240, and a bus 3300.

The CPU 3100 may control the overall operation of the computing system 3000. The CPU 3100 may execute various operations. In at least some example embodiments, the CPU 3100 may be a general-purpose processor used in a typical computer or a workstation.

The memory 3120 may temporarily store data used to operate the computing system 3000. The memory 3120 may exchange data with the CPU 3100. The memory 3120 may be used as a main memory, a processing memory, a buffer memory or the like. In at least some example embodiments, the memory 3120 may include a volatile memory such as static RAM (SRAM), dynamic RAM (DRAM), and synchronous DRAM (SDRAM) or a nonvolatile memory such as PRAM, MRAM, RRAM, and FRAM. The memory 3120 may include at least one memory module or at least one memory package.

The graphics processing unit 3210 may perform the overall operation associated with image processing. The graphics processing unit 3210 may include a video codec 3215 to encode or decode video information. The video codec 3215 may be implemented in the form of software, hardware or hybrid. The graphics processing unit 3210 and the video codec 3215 may be implemented based on inventive concepts described with reference to FIGS. 1 to 11. In particular, the graphics processing unit 3210 may encode a plurality of macroblocks included in a frame through received x-axis, y-axis, and z-axis motions $\Delta x$, $\Delta y$, and $\Delta z$. Accordingly, inventive concepts may be realized by the graphics processing unit 3210 that is configured independently of the CPU 3100.

The user interface 3220 may relay communication between a user and the computing system 3000 according to the control of the CPU 3100. In at least some example embodiments, the user interface 3220 may include user input interfaces such as a keyboard, a keypad, a button, a touch panel, a touch screen, a touch ball, a touch pad, a camera, a gyroscope sensor, and a vibration sensor. In addition, the user interface 3220 may include user output interfaces such an LCD, an OLED display, an AMOLED display, an LED display, a speaker, and a motor.

The communication unit 3230 may communicate with an external entity of the computing system 3000 according to the control of the CPU 3100. For example, the communication unit 3230 may communicate with an external entity of the computing system 3000 based on at least one of wireless communication techniques or protocols such as LTE, WiMax, GSM, CDMA, Bluetooth, NFC, WiFi, and RFID or wired communication protocols such as USB (Universal Serial Bus), SCSI (Small Computer System Interface), PCI (Peripheral Component Interconnect) Express, ATA (Advanced Technology Attachment), PATA (Parallel ATA), SATA (Serial ATA), SAS (Serial Attached SCSI), IDE (Integrated Drive Electronics), and Firewire.

The storage unit 3240 may store data desired to be retained. In at least some example embodiments, the storage unit 3240 may include a nonvolatile memory such as a flash memory, a PRAM, an MRAM, an ReRAM, and an FRAM. In at least some example embodiments, the storage unit 3240 may include at least one of a storage device such as a solid-state drive (SSD), a memory card such as an embedded multimedia card (eMMC), and a memory stick.

The bus 3300 may provide a communication path between components of the computing system 3000. The components of the computing system 3000 may transmit/receive data to/from each other according to a bus format. In at least some example embodiments, the bus format may include USB, SCSI, PCIe, ATA, PATA, SATA, SAS, and IDE.

Processors, memories, and circuits according to example embodiments of inventive concepts may be packaged as one of various types to be subsequently embedded. For example, a video encoding circuit and a processing device according to example embodiments of inventive concepts may be packaged by one of PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

While the present disclosure has been particularly shown and described with reference to example embodiments thereof, inventive concepts are not limited to the above-described example embodiments. It will be understood by those of ordinary skill in the art that various changes and variations in form and details may be made therein without departing from the spirit and scope of inventive concepts as defined by the following claims.

What is claimed is:

1. An encoding system comprising:
a motion estimation unit configured to receive a plurality of frames and x-axis, y-axis, and z-axis motion data corresponding to the plurality of frames, the plurality of frames including a first frame and a second frame, the first frame being a first reference frame to an encoding target frame and the second frame being the encoding target frame, the motion estimation unit further configured to generate a motion vector to indicate a positional relationship between a macroblock of the first frame and a target macroblock of the second frame;
a motion compensation unit configured to compensate for a motion of the target macroblock of the second frame according to the motion vector;
a transform and quantization unit configured to output transformed and quantized data obtained by transforming and quantizing the motion-compensated target macroblock of the second frame; and
an encoder configured to encode the transformed and quantized data and output the encoded data,
wherein the motion estimation unit is configured to estimate x-axis, y-axis, and z-axis motions based on the x-axis, y-axis, and z-axis motion data, estimate one of expansion and contraction of a subject in the target macroblock of the second frame based on the z-axis motion, and adjust a search range of the first frame based on the estimation of the one of expansion and contraction, and
the motion estimation unit is configured to set a search start macroblock of the first frame based on the x-axis, y-axis, and z-axis motions and adjust the search range based on the x-axis, y-axis and z-axis motions.

2. The encoding system as set forth in claim 1, wherein the motion estimation unit is configured to set the search start macroblock of the first frame by transforming the x-axis, y-axis, and z-axis motions into motions on a plane frame.

3. The encoding system as set forth in claim 1, wherein the motion estimation unit is configured to reduce the search range of the first frame if the motion estimation unit estimates expansion of the subject in the target macroblock of the second frame based on the z-axis motion.

4. The encoding system as set forth in claim 1, wherein the motion estimation unit is configured to increase the search range of the first frame if the motion estimation unit estimates contraction of the subject in the target macroblock of the second frame based on the z-axis motion.

5. The encoding system as set forth in claim 1, further comprising:
an inverse transform and inverse quantization unit configured to inversely, transform and inversely quantize the transformed and quantized data;
a filter configured to filter the inversely transformed and inversely quantized data; and
a frame store unit configured to store the filtered data.

6. The encoding system as set forth in claim 1, wherein the plurality of frames further includes a third frame being a second reference frame,
the motion estimation unit is configured to estimate the x-axis, y-axis and z-axis motions for each of the first and third frames to encode the target macroblock of the second frame, and
the motion estimation unit is configured to adjust the search range of the first frame and a search range of the third frame based on the z-axis motion.

7. The encoding system as set forth in claim 6, wherein the search range of each of the first and third frames includes a range varying based on the z-axis motion.

8. The encoding system as set forth in claim 6, wherein each of the first and third frames is one of a previous frame and a subsequent frame of the second frame.

9. An encoding system comprising:
a motion estimation unit configured to receive a plurality of frames and motion data, the plurality of frames including at least a first frame and a second frame, the first frame being a reference frame for the second frame, the motion estimation unit being further configured to adjust a search range of the first frame based on a change in size between a subject in the first frame and the subject in the second frame; and
an encoder configured to encode the second frame based on the adjusted search range, wherein the motion estimation unit is configured to set a search start macroblock of the first frame based on x-axis, y-axis, and z-axis motions and adjust the search range based on the x-axis, y-axis and z-axis motions.

10. The encoding system of claim 9, wherein the motion estimation unit is configured to determine the change in size based on the z-axis motion.

11. The encoding system of claim 9, wherein the motion estimation unit is configured to generate a motion vector between the first frame and the second frame, the motion vector indicating a positional relationship between the subject in the first frame and the subject in the second frame.

12. The encoding system of claim 9, wherein the motion estimation unit is configured to adjust the search range further based on a change in the size between the subject in the second frame and the subject in a third frame.

13. The encoding system of claim 12, wherein the first frame is a previous frame of the second frame and the third frame is a subsequent frame of the second frame.

* * * * *